US009025024B2

(12) United States Patent
Xu et al.

(10) Patent No.: US 9,025,024 B2
(45) Date of Patent: May 5, 2015

(54) SYSTEM AND METHOD FOR OBJECT IDENTIFICATION AND TRACKING (75) Inventors: Beilei Xu, Penfield, NY (US); Wencheng Wu, Webster, NY (US); Lalit Keshav Mestha, Fairport, NY (US); Graham Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 739 days.

(21) Appl. No.: 13/247,343

(22) Filed: Sep. 28, 2011

(65) Prior Publication Data

US 2013/0076913 A1 Mar. 28, 2013

(51) Int. Cl.
*H04N 7/18* (2006.01)
*G06K 9/20* (2006.01)
*H04N 5/232* (2006.01)
*H04N 5/33* (2006.01)

(52) U.S. Cl.
CPC .......... *G06K 9/2018* (2013.01); *H04N 5/23206* (2013.01); *H04N 5/23219* (2013.01); *H04N 5/332* (2013.01)

(58) Field of Classification Search
CPC ................................ H04N 7/18; H04N 7/181
USPC .......................................................... 348/142
See application file for complete search history.

(56) References Cited

U.S. PATENT DOCUMENTS

| 6,967,612 | B1 * | 11/2005 | Gorman et al. ................. 342/22 |
| 7,349,076 | B2 | 3/2008 | Yao |
| 7,355,714 | B2 | 4/2008 | Wang et al. |
| 7,385,704 | B2 | 6/2008 | Mestha et al. |
| 7,417,746 | B2 | 8/2008 | Lin et al. |
| 2004/0206914 | A1 * | 10/2004 | Schomacker et al. ..... 250/458.1 |
| 2010/0322480 | A1 | 12/2010 | Banerjee et al. |

OTHER PUBLICATIONS

Wang et al., "Determining a Total Number of People in an IR Image Obtained Via an IR Imaging System", U.S. Appl. No. 12/967,775, filed Dec. 14, 2010.
Wang et al., "Determining a Number of Objects in an IR Image", U.S. Appl. No. 13/086,006, filed Apr. 13, 2011.
Mestha et al., "Method for Classifying a Pixel of a Hyperspectral Image in a Remote Sensing Application", U.S. Appl. No. 13/023,310, filed Feb. 8, 2011.
Mestha et al., "Hyperspectral Image Reconstruction Via a Compressed Sensing Framework", U.S. Appl. No. 13/180,895, filed Jul. 12, 2011.

* cited by examiner

*Primary Examiner* — Chikaodili E Anyikire
(74) *Attorney, Agent, or Firm* — Philip E. Blair; Fleit Gibbons Gutman Bongini & Bianco P.L.

(57) ABSTRACT

What is disclosed is a system and method for identifying materials comprising an object captured in a video and for using the identified materials to track that object as it moves across the captured video scene. In one embodiment, a multi-spectral or hyper-spectral sensor is used to capture a spectral image of an object in an area of interest. Pixels in the spectral planes of the spectral images are analyzed to identify a material comprising objects in that area of interest. A location of each of the identified objects is provided to an imaging sensor which then proceeds to track the objects as they move through a scene. Various embodiments are disclosed.

14 Claims, 10 Drawing Sheets

SYSTEM AND METHOD FOR OBJECT IDENTIFICATION AND TRACKING

TECHNICAL FIELD

The present invention is directed to systems and methods for identifying materials comprising an object in a video and for using the identified materials to track that object as it moves across the captured scene.

BACKGROUND

It is desirable to identify an object in a video and track the movement of that object across a plurality of frames in the video sequence. Prior efforts in this regard have focused on motion-based, shape-based, color-based tracking or a combination of those methods. Such methods are easily confused and suffer performance degradation in the presence of other object(s) of similar size/shape/motion/color in the vicinity of the object of interest, or a partial occlusion of the object, or a change of pose. Shadows can be particularly confusing to prior art methods because the shadow moves in the video sequence along with the object.

Spectral imaging deals with imaging spectral bands over a spectral range, and produces the spectra of all pixels in the captured scene. A primary advantage to spectral imaging is that, because an entire spectrum is acquired at each point and the wavelengths are known, post-processing allows other available information from a dataset to be mined such as type of material. Disadvantages are cost and complexity. Data storage capacity can be significant since spectral images. A need exists to apply spectral imaging to facilitate object identification and tracking without noticeably increasing the cost and computational complexity.

Accordingly, what is needed in this art are systems and methods for identifying materials comprising an object captured in a video and for using the identified materials to track that object as it moves across the captured video scene.

INCORPORATED REFERENCES

The following U.S. patents, U.S. patent applications, and Publications are incorporated herein in their entirety by reference.

"Determining A Total Number Of People In An IR Image Obtained Via An IR Imaging System", U.S. patent application Ser. No. 12/967,775, by Wang et al.

"Determining A Number Of Objects In An IR Image", U.S. patent application Ser. No. 13/086,006, by Wang et al.

"Method For Classifying A Pixel Of A Hyperspectral Image In A Remote Sensing Application", U.S. patent application Ser. No. 13/023,310, by Mestha et al.

"Hyperspectral Image Reconstruction Via A Compressed Sensing Framework", U.S. patent application Ser. No. 13/180,895, by Mestha et al.

"Reconfigurable MEMS Fabry-Perot Tunable Matrix Filter Systems And Methods", U.S. Pat. No. 7,355,714, to Wang et al.

"Two-Dimensional Spectral Cameras And Methods For Capturing Spectral Information Using Two-Dimensional Spectral Cameras", U.S. Pat. No. 7,385,704.

"Fabry-Perot Tunable Filter Systems And Methods", U.S. Pat. No. 7,417,746.

BRIEF SUMMARY

What is disclosed is a novel system and method for identifying materials comprising an object captured in a video and for using the identified materials to track that object as it moves across the captured video scene. In one embodiment hereof, a hybrid camera system is disclosed in which one camera captures data at a high spatial resolution and high frame rate for visual information and motion tracking and other camera data at a lower spatial resolution and lower frame rate, but high spectral resolution for multi-spectral data collection for material identification and for providing relevant information to the 1$^{st}$ camera for subsequent refinement of tracking. The present system can be used to either make use of the material information determined to comprise an object in an area of interest such that movement of the object can be tracked in a video sequence, or to initiate object tracking upon object identification, or to signal an alert in response to the object's materials having been determined to match one or more materials on a list of materials of interest such as an explosive compound. Advantageously, the teachings hereof provide a solution to object identification and tracking which is robust and which has a reduced computational complexity due to data reduction.

In one example embodiment, the present method for object identification and tracking in a video sequence involves the following. In response to a triggering event such as, for example, a person or object having moved past a motion sensor in a restricted area, a spectral sensor captures at least one spectral image of a pre-defined area of interest, as is more fully described herein. The spectral image comprises different spectral planes each having pixel locations corresponding to a reflectance obtained at a wavelength band of interest. The pixel values are analyzed to identify materials comprising objects in the area of interest. A location of at least one object of interest is provided to an imaging sensor which, in turn, tracks the movement of the object as it traverses the scene.

In another embodiment, an area of interest is selected from a real-time video captured using a conventional video camera. The area of interest can be selected based upon any criteria such as, for example, an operator viewing the video wishes to perform a spectral analysis on one or more objects in a scene or a motion-based object detection algorithm known in the arts initiates to perform a spectral analysis on specific regions in a scene. The location of the selected area of interest is communicated to a multi-spectral or a hyper-spectral camera which proceeds to capture spectral images of that area. Pixel values of the different spectral planes captured in those images are analyzed to identify one or more materials comprising objects in the area of interest. The identified materials are compared against a list of materials of interest. If the materials determined to comprise the object match any of the materials on that list then an alert signal is sent. In another embodiment, the location of an object which matched one or more of those materials on the list is provided to a video camera or the same video camera which, in turn, proceeds to track or keep tracking the movement of that object or refined object in the scene and communicates that video back to a workstation for an operator review.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for identifying materials comprising an object captured in a video and for using the identified materials to track that object as it moves across the captured video scene.

NON-LIMITING DEFINITIONS

Figure 1:
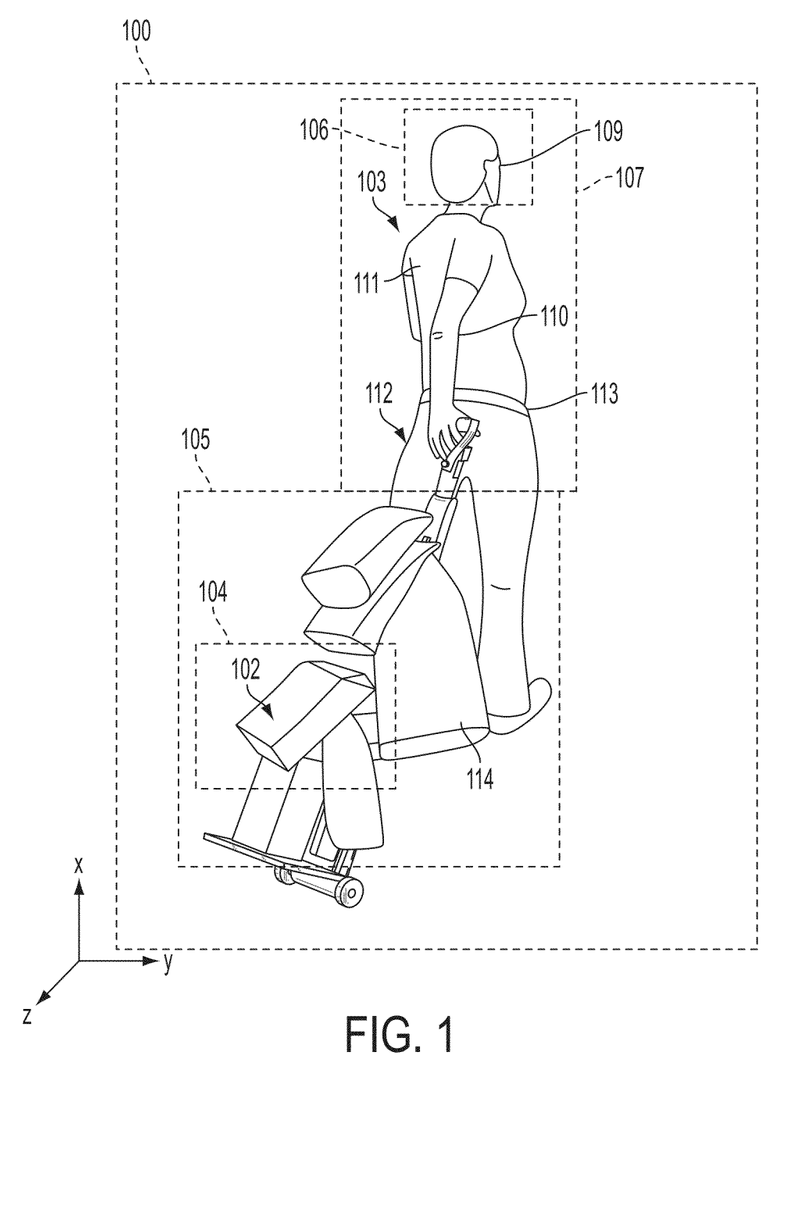
FIG. 1 shows an example image of a frame of a video sequence captured of a person in an airport pulling a wheeled luggage carrying device loaded will various packages wherein various objects of interest have been identified and areas of interest encompassing those objects have been selected.

An "object of interest" can be an object or a person in a scene which is intended to be analyzed for material identification and, in various embodiments, for object tracking. FIG. 1 shows an example scene 100 of a person 103 pulling a wheeled luggage carrying device containing various packages as the person walks through an airport setting. Example objects of interest are package 102, satchel 114, and person 103 of scene 100 of FIG. 1. If the object of interest is person 103, it may be desired to isolate pixels of human skin such as those in facial area 109 and exposed arm 110, so that a movement of this person can be tracked by an imaging sensor, as defined herein. Objects of interest may be the person's shirt 111, pants 112 and belt 113, such that these materials can be identified with specificity. It may be desired to identify materials comprising package 102 and/or satchel 114. Once the materials comprising an object have been identified, an object (or blob) can be formed out of pixels having that same material and a location determined for that object relative to a location in the scene wherein image was captured.

Figure 2:
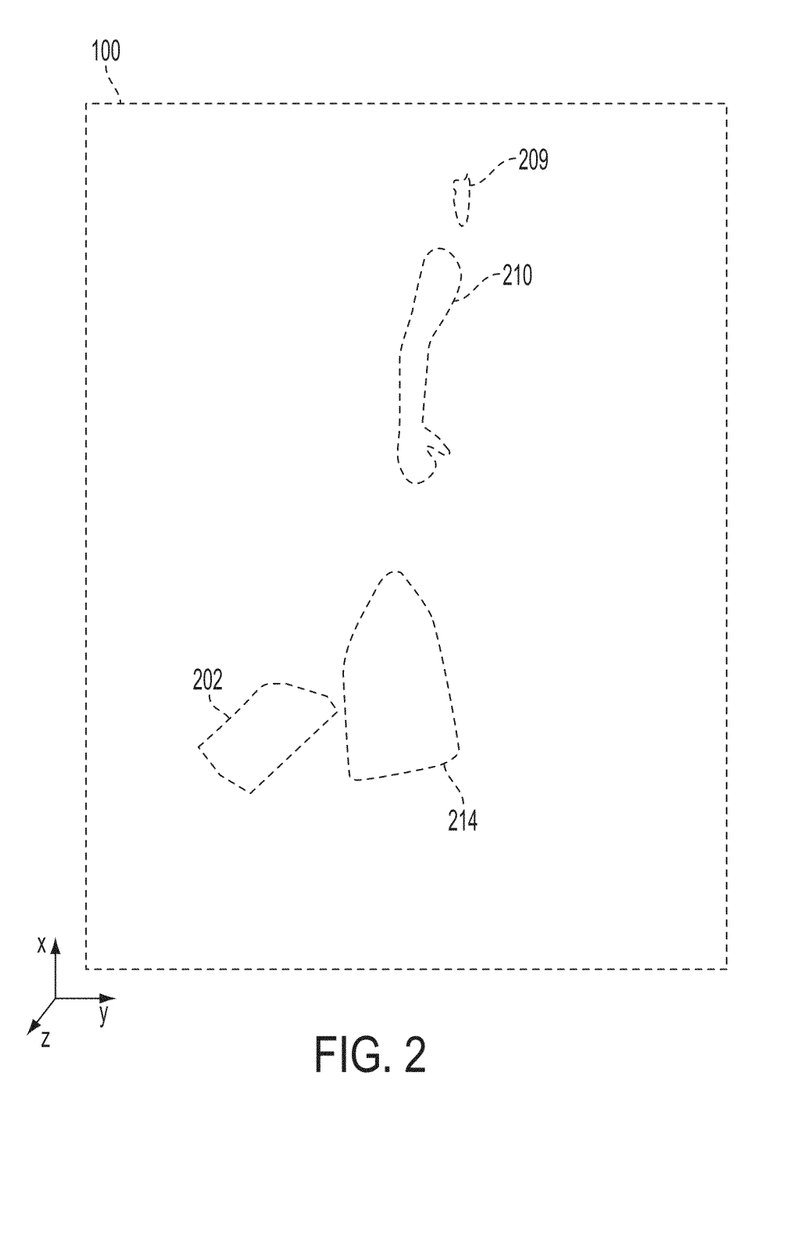
FIG. 2 shows various formed objects by having clustered and isolated pixels of the objects of interest of FIG. 1.

A "formed object" is an object (or blob) formed out of pixels having reflectances identified as the same material. Example formed objects are shown in FIG. 2. Pixels identified as human skin in the face 109 of person 103 can be isolated and clustered to form object 209. A formed object may be a boundary thereof which separates pixels of the same material from surrounding pixels of a different material. Likewise, pixels identified as a material comprising the object of package 102 can be isolated to collectively form object 202 or a boundary thereof. Pixels identified as a material comprising the object of satchel 114 collectively form object 202.

A "location of an object" or the "location of a formed object", refers to the location of that object in the image. The location can be determined directly from the (x,y) locations of pixels determined to identify that object, or from a position of the identified object relative to a known position of a known object in the scene such as a doorway, chair, or the like. The size of the object can be determined in a similar manner. If the object of interest is person 103 then pixels identified as human skin (face 109 and arm 110) can be isolated in the image and clustered to form objects 209 and 210, respectively. The location of the arm and/or face in the image is then communicated to an imaging sensor or controller thereof so that the movement of that person can be tracked as they traverse the scene. One embodiment hereof is directed to an object's location being determined and communicated to an imaging sensor or a controller thereof such that the movement of that object can be tracked with the imaging sensor.

An "area of interest" refers to an area of a scene containing an object of interest. The area of interest can be a whole scene or a portion of a scene. One or more spectral images of the area of interest are captured using either a multi-spectral or a hyper-spectral sensor such that one or more objects in the area of interest can be identified by an analysis of the pixel reflectances captured at wavelength bands of interest as defined by the filters of the spectral sensor. If, for example, package 102 of FIG. 1 is an object of interest intended to be analyzed for identification and subsequent tracking, then the area of interest would be the area encompassed by the rubber-band box 104. If a spectral analysis is desired to be performed on all the packages in scene 100 such that the materials comprising those packages can be identified and perhaps the movement of those packages tracked as they traverse the scene, then the spectral sensor would capture a spectral image of area of interest 105. If person 103 was of interest then the spectral sensor would capture one or more spectral images of area of interest 107. The area of interest may be a smaller area in a given scene, such as area of interest 106, encompassing the person's head and face 109. More than one area of interest can be identified for spectral analysis in a given scene. Spectral images can be captured of each area of interest depending on the number and/or multi-imaging capabilities of the spectral sensors employed. The areas of interest in a given scene would necessarily depend on the environment where the teachings hereof find their intended uses. The embodiment of FIG. 1 is but one example. A conventional video camera image of the area of interest is selected based on object motion, shape, color or a combination thereof.

"Selecting an area of interest". An area of interest can be selected by a variety of methods depending on the implementation. For example, in one embodiment, the area of interest is manually selected by a user/operator watching a video of people moving about an airport terminal. Such a scene could be captured by one or more imaging sensors placed throughout the terminal and preferably recorded by video recording devices for subsequent analysis and review. An area of interest may be manually determined by such an operator using a mouse, for example, to define a rubber-band box or region of the video being played on a monitor. Example boxes encompassing various objects of interest are shown encompassing areas of interest 104, 105, 106, and 107 of FIG. 1. The area of interest in a given scene of a video may be defined by such a box having been automatically placed around an object already being tracked in a video by conventional object tracking software (e.g. via motion, color, shape etc.) such that it encompasses all or some of the objects being presently tracked. The area of interest in a given scene may be fixed such as, for instance, a doorway or hallway in a restricted area, such that anybody or anything that comes into that area automatically becomes the object of interest. A spectral sensor captures a spectral image of the area of interest for spectral analysis. The area of interest can also be defined by a triggering event. For example, the expected size of a tracked object is below or above a threshold, the size of the tracked object is changed, or a new moving object is detected in the scene.

An "imaging sensor" is a device for capturing video images of a scene such as a video of a person pulling the luggage carrier through an airport terminal (person 103 of FIG. 1). Such a sensor has a high frame rate with high spatial resolution for spatial feature extraction. An imaging sensor can be, for example, a monochrome video camera for capturing black/white video images, or a color video camera for capturing color images over channels corresponding to the visual primary colors, typically RGB, or a combination thereof, and/or a spectral sensor comprising a single device that can be operated in dual modes, i.e., a multi-spectral or hyper-spectral mode with high spectral resolution for material analysis or with low spectral resolution, but high spatial and high frame rate for object tracking. Such a hybrid device would preferably operate in either mode simultaneously or individually, on demand.

A "spectral sensor" refers to a multi-spectral or hyper-spectral camera system for capturing a respective multi-spectral or hyper-spectral image of a scene. Such a device has a low frame rate and low spatial resolution but is capable of relatively high spectral resolution. Spectral sensors, in the form of cameras and video equipment, are readily available from an array of vendors in different streams of commerce.

Figure 3:
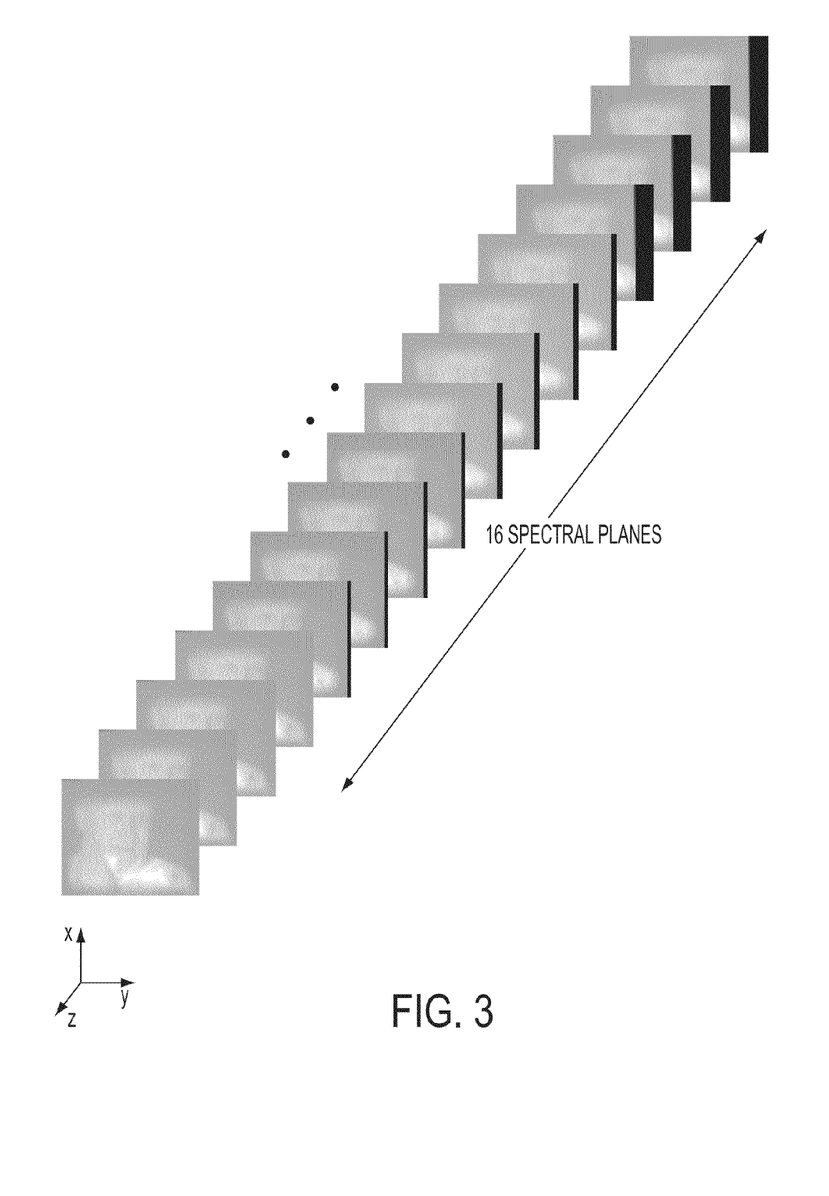
FIG. 3 shows hyper-spectral image data cube comprising 16 different spectral planes.

A "spectral image" is an image captured by a multi-spectral or hyper-spectral sensor. Pixels in the captured spectral image contain spectral information about that scene because each pixel has an associated intensity value measured in terms of a captured reflectance centered about a wavelength band of interest. Hyper-spectral images are images of contiguous spectral planes captured using a hyper-spectral sensor. Multi-spectral image have non-contiguous spectral planes. Hyper-spectral images are processed into an associated hyper-spectral image data cube comprising a 3D matrix constructed of a combination of 2D image data and 1D spectral components. The 2D image data comprises an array of pixels with each pixel location having a reflectance value centered about a wavelength of interest. FIG. 3 shows an example of an array of 2D image data captured at each of 16 different spectral planes using a hyper-spectral sensor. Various embodiments of hyper-spectral sensors employ an array of filters, e.g., Fabry-Perot filters, to restrict the capture of spectral data to wavelength bands of interest while rejecting wavelengths outside that band. The spectral sensor may be activated in response to a triggering event having occurred. Such triggering events may take a variety of forms such as, for example, a person entering an area which is off-limits to unauthorized personnel and having tripped a sensor. Other triggering events may be obtained from sensors which have, for instance, detected body heat, or have "sniffed" the presence of a controlled substance or an explosive material in a bag or piece of luggage being pulled by a person in an airport. Triggering events may take a variety of forms depending on the environment wherein the teachings hereof find their intended uses.

A "material of interest" might be, for example, a particular explosive compound, metals, certain fabrics, human skin, and the like. The list of materials that may be of interest will depend on the specific environment where the teachings hereof find their intended implementations. Such environments may be, for instance, an airport, a courthouse, a government office building, to name a few. In one embodiment hereof, identified materials determined to comprise an object of interest are cross-referenced to a list of materials of interest and an alert is initiated if the material is found to be any of the materials on the list.

A "materials spectral database" contains molecular spectral information of known substances. Identification of materials comprising an object can be determined by cross-referencing reflectances of pixel locations in the spectral image with those of known materials in the materials spectral database. One example materials spectral database is the High-Resolution Transmission Molecular Absorption Database (HITRAN) maintained by the Atomic and Molecular Physics Division of the Harvard-Smithsonian Center for Astrophysics. HITRAN is downloadable from Harvard's website. Due to variations in illumination, sensing geometries, sensor band sensitivities, and the like, of the different spectral sensors available in commerce, it may be desirable to resample and update the spectral data in the materials database to the specific spectral sampling characteristics of the spectral sensor(s) being employed. By analyzing a selected few frames for material identification, an accurate data set can be maintained for a select group of materials of interest. If additional materials of interest arise, spectral analysis can be performed again and the database updated accordingly.

Brief Introductory Discussion

As discussed in the background section hereof, conventional object tracking systems rely on object motion or spatial/color features. In real world applications, these features alone are insufficient to identify an object of interest in a captured video sequence for tracking. Advanced object identification methods may use additional color information (e.g. using hue to separate out shadow vs. true object etc.) or dedicated face detection modules to solve this particular failure mode, which often brings up other failure modes and increases the computational complexity and cost. The present system and method identifies an area of interest through either a motion/background detection or a user selection, and identifies the object in the area of interest through material analysis/identification and then tracks the movement of the refined object as it moves through a scene.

In one embodiment, the present object identification and tracking system consists of two cameras each providing different capabilities, i.e. a first conventional RGB camera providing a high spatial resolution and high frame rate, and a multi-spectral or hyper-spectral sensor providing high spectral resolution. The conventional video camera continuously pans a desired area and provides a video feed of a scene such as, for example, a hallway in secure area of a building or terminal. The video feed may be provided to a workstation display for visual review of by an operator. The movement of the camera may be controllable by the operator as well. In other embodiments, the video camera operates independently of an operator and automatically tracks the movement of objects in the scene using conventional object tracking methods. At a key point such as, for instance, when an object/person enters or crosses a designated zone such as, for example, the object enters a restricted hallway, a spectral sensor is triggered to capture one or more spectral images of an area of interest in that scene. The area of interest may be communicated to the spectral sensor by an operator or automatically sent to the spectral sensor by the imaging sensor such that the spectral sensor can move and focus on a particular area containing an object of interest. The spectral sensor captures a spectral image of the area of interest. Materials comprising objects in the captured spectral image are determined via spectral analysis of pixel reflectances which are cross-referenced with reflectance values of known materials in a materials spectral database. The identified material(s) of the object(s) in the area of interest are provided to a workstation for review by an operator. In another embodiment, the identified material(s) comprising objects of interest are automatically cross-referenced with a list of materials of interest such as human skins, leather, explosives, for example, and an alert is initiated on a workstation or a signal generated if the identified material is determined to match any of the materials on the list. Signals may take the form of a sound, a light, a message being transmitted, or a device being activated. In other embodiments, if the identified material is found to match any of the materials of interest on the list, a location of the object is provided to an imaging system, or a controller thereof, such that a movement of the object with material of interest can be tracked through the scene (and beyond) using conventional object tracking methods.

Figure 4A:
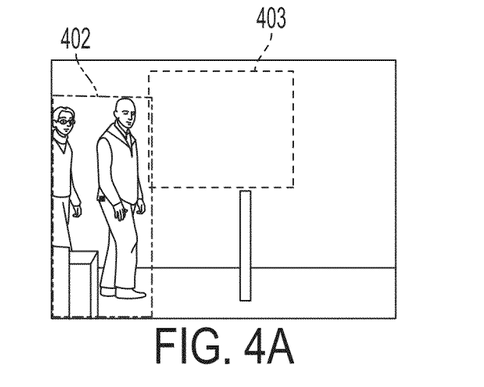
FIG. 4 shows an operation of an embodiment of a dual camera system consisting of two imaging systems, i.e., a video camera, and a spectral sensor which is triggered upon an object having entered a fixed area of interest.
Figure 4B:
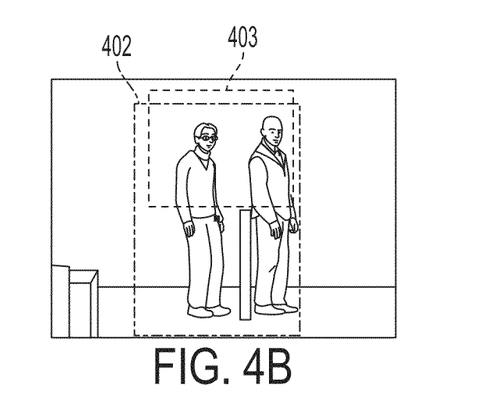
Figure 4C:
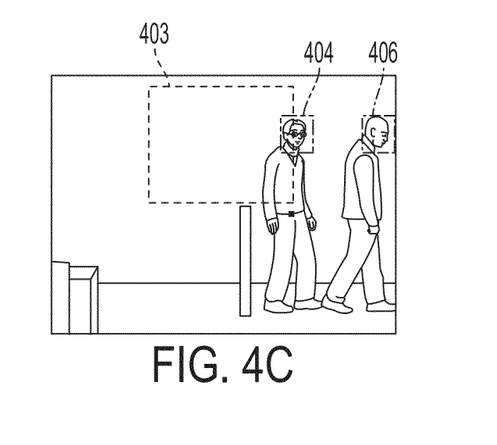
Figure 5A:
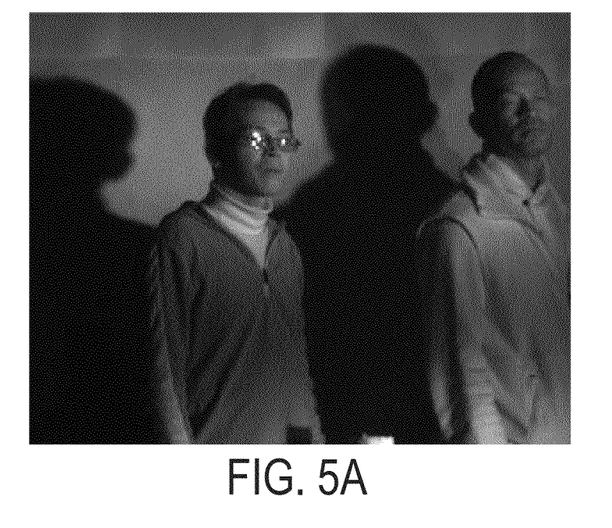
FIG. 5 shows images captured using a single dual mode camera system.
Figure 5B:
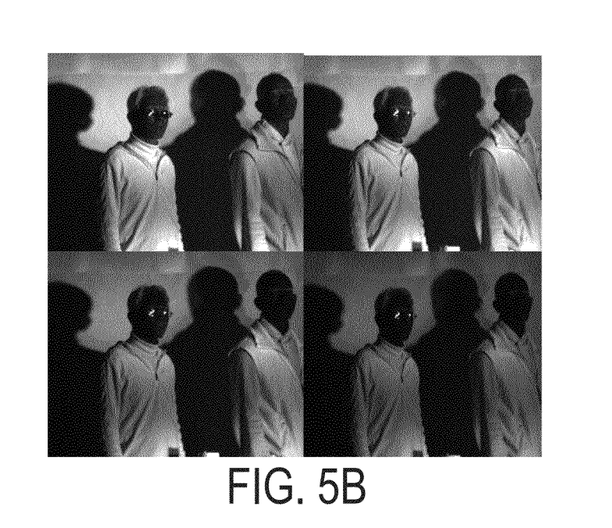

In yet another embodiment, as shown in FIG. 4, the area of interest 403 of scene 400 is fixed, and in response to a sensor such as a motion sensor or an IR sensor having detected an object entering that area, the spectral sensor captures a spectral image of the area and passes location of the objects onto an object tracking system in the imaging sensor such that a movement of the object can be tracked. In FIG. 4A, a conventional video camera is tracking two persons, (an area defined by box 402), using an object tracking software. Spectral sensor is focused on fixed area of interest 403. As two persons in the scene move into an area defined by box 404, the spectral sensor is triggered to capture a spectral image of area 403. In this embodiment, a spectral analysis of the captured spectral image data identifies a material of interest, i.e., human skin. Objects are formed from pixels identified as human skin, i.e., the faces of both persons in the image, and a location of those objects is communicated to the tracking system which now more particularly tracks the movement of the identified objects in areas 404 and 406. In such a manner, the amount of information needed by the tracking software to track these two persons as they move across the video sequence is reduced from information contained in area 404 to information contained in areas 404 and 406. As the two persons being tracked pass outside the field of view of the tracking camera, information about the locations of 404 and 406 is passed on to one or more other camera systems which, in turn, start tracking their movements across their own respective fields of view. The video sequences captured of the tracked persons can be also be provided to a monitor for visual examination by an operator. One or more cameras can be zoomed by the operator to capture close-up images of their faces. Alternatively, areas 404 and 406 are used by a facial recognition system such that the tracked persons can be identified. In FIG. 4, there are two separate camera systems but the cameras may be combined into a single unit with, for example, dual mode mentioned earlier. FIG. 5 shows images captured by a single dual mode camera capable of capturing both conventional video (shown as a single frame in FIG. 5A) and four different spectral planes of a spectral image (shown at FIG. 5B). Note that the dual mode mentioned here can be a hardware implementation or a software implementation. As an example, in software implementation, one can imagine that with a very capable spectral sensor comprising a high spectral resolution (N-dimension), high spatial resolution, and high frame rate, one can project the high spectral resolution to a reduced dimension (up to N−1). For object tracking mode (mode 1), this can be done based on the material of interest and by performing analysis such as PCA, ICA etc. along the spectral dimension while retaining the high spatial resolution, and high frame rate. This will make the system computationally efficient while at the same time retaining spectral contents due to dimensionality reduction. Via event triggering as discussed earlier, this sensor would switch back to high spectral resolution sensing if a new material of interest is requested (mode 2) and repeat the spectral dimensionality reduction and then tracking as in mode 1. Note that since in this example the dual mode (mode 1 and mode 2) is achieved via data analysis without altering the hardware aspect of the sensing mechanism, we refer it as software implemented dual mode.

Example Networked System

Figure 6:
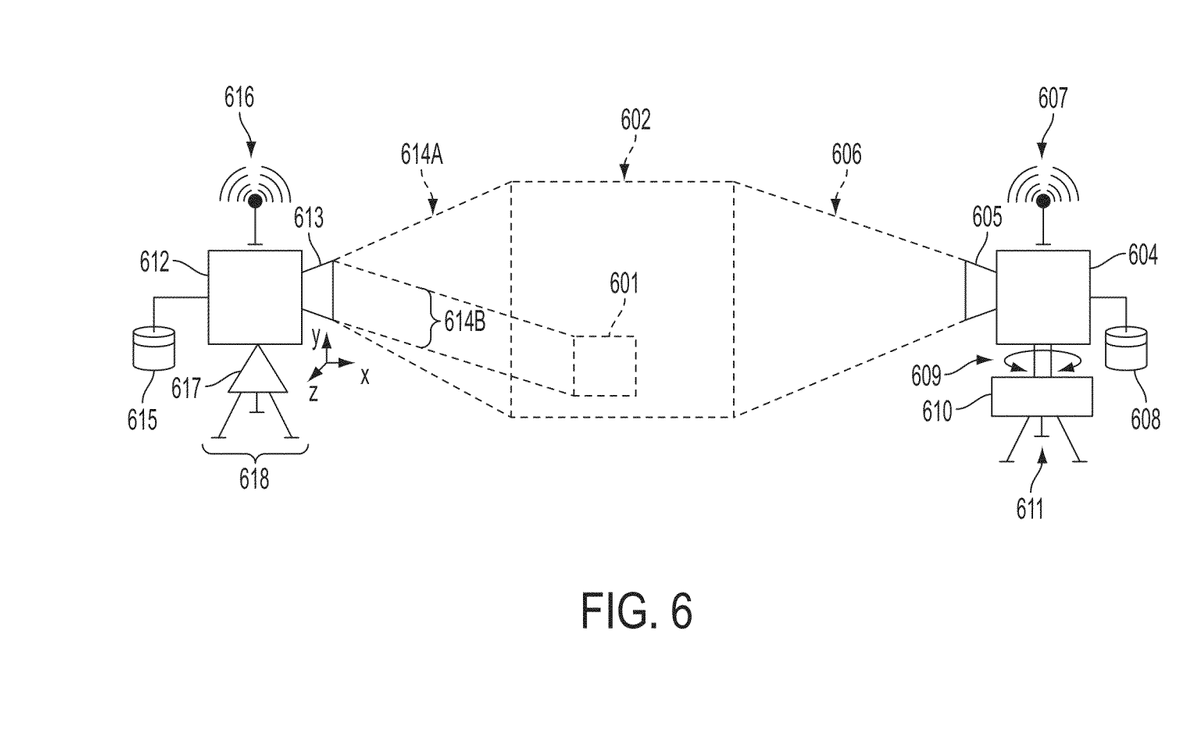
FIG. 6 illustrates a functional block diagram of one example embodiment of the present object identification and tracking system.

Reference is now being made to FIG. 6 which illustrates a functional block diagram of one example embodiment of the present object identification and tracking system. In FIG. 6, a video sequence comprising a plurality of image frames of a scene is captured by imaging sensor 604. In this example, imaging sensor 604 is a RGB video camera which outputs color signals corresponding to the video images captured of scene 602. For discussion purposes, scene 602 is the example scene 100 of FIG. 1 showing a person in an airport setting pulling behind them a wheeled device containing various objects. Also for discussion purposes, area of interest 601 is any of the areas of interest of FIG. 1.

The embodiment of FIG. 6 shows imaging sensor 604 positioned such that scene 602 is in the field of view 606 of lens 605. Video camera 604 is shown further comprising an antenna 607 for placing any of the components of system 604 in bi-directional communication with a processing system and/or a computer workstation such as that is shown and described with respect to FIG. 9. The captured video image sequences are transmitted via antenna 607 and displayed on a video monitor 932 of workstation 931 of FIG. 9 for review by an operator (not shown). The field of view of lens 605 is controllable by mechanisms (not shown) which are internal to camera 604 such that the camera can focus, zoom-in, zoom-out, switch filters, and the like. Imaging sensor 604 is rotatably fixed to controller 610 which effectuates a movement of the camera or lens by rotating spindle 609. The movement of spindle 609 changes the sensor's position or focus in response to signals received via device 607 so the identified object can be tracked as it moves across scene 602. Video camera 604 is also shown having a storage device 608 for storage and retrieval of video images, time data, camera location, and the like, and for storing machine readable program instructions, formulas, variables, functions, and the like, as are needed. Storage device 608 may be entirely internal to camera 604. Imaging sensor 604 is shown mounted on tripod 611.

Also shown in FIG. 6 is spectral sensor 612 having a lens 613 positioned such that scene 602 is in the camera's field of view 614A. Camera 612 is rotatably mounted on controller 617 such that the position of the spectral sensor can be changed in any of a x, y, and z direction. The field of view of lens 613 of camera 612 is controllable by signals received via communication device 607 such as, for example, focus, zoom-in, zoom-out, and the like. Field of view 614A encompasses substantially all of scene 612 as that of the field of view 606 of camera 604. In this case, both imaging sensor 604 and spectral sensor 612 are focused on the same area of interest 602. It should be appreciated that the position of spectral camera 612 can be modified and the focus of lens 613 changed via internal mechanisms (not shown) such that spectral images are captured in field of view 614B shown encompassing area of interest 601. Such a change in the camera's position and field of view is effectuated by command signals received via device 616 from workstation 931 of FIG. 9.

Other controllers (not shown) internal to spectral sensor 612 may receive signals and/or program instructions to change or otherwise modify various aspects of the camera such as, switching filters, changing lens, zooming in/out, and the like. Spectral sensor 612 is also shown comprising a storage media 615 for storing the captured spectral images and for retrieving information. Storage device 615 may be internal to camera 613. Camera 613 is shown mounted on tripod 618. Images captured by spectral sensor 612 and camera 604 can be transmitted via antennas 616 and 607, respectively, to an image processing system such as system 920 of FIG. 9, which receives the images via communication device 719 and processed the images. The system of FIG. 6 may comprise a plurality of spectral cameras such that spectral images of multiple areas of interest (such as areas 104-107 of FIG. 1) in a given scene can be captured simultaneously or sequentially. Likewise, video camera 604 may comprise a plurality of different video camera systems with each tracking a different object. Cameras 612 and 604 may comprise a single dual mode camera, as discussed with respect to the images of FIGS. 5A-B.

Flow Diagram of an Example Embodiment

Figure 7:
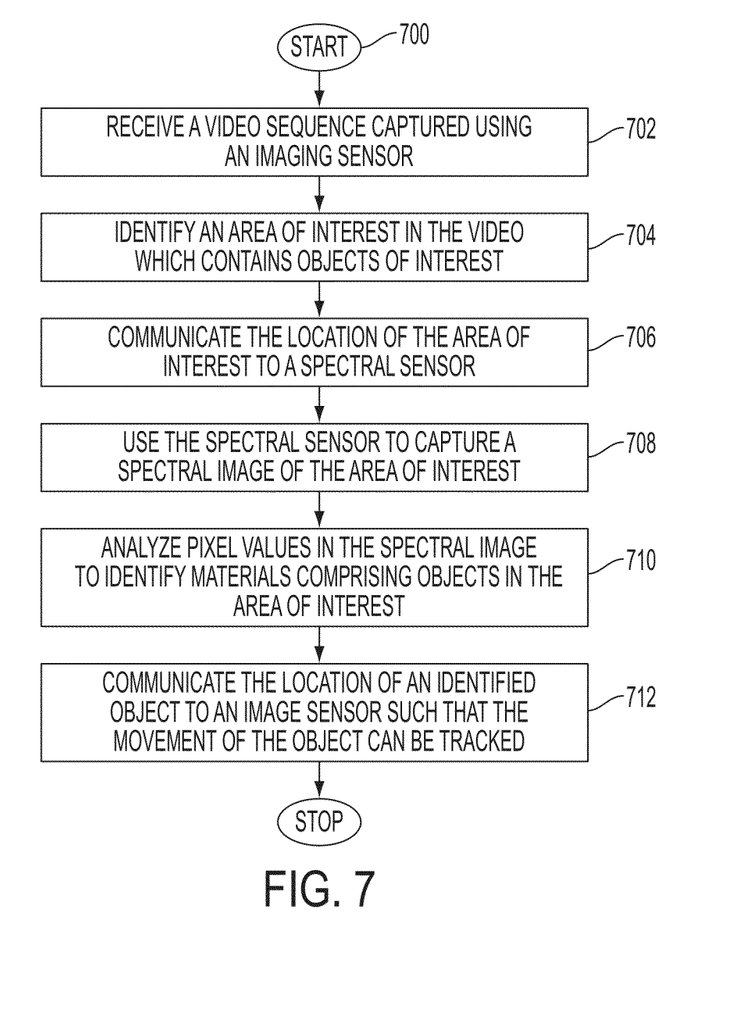
FIG. 7 is a flow diagram which illustrates one example embodiment of the present method for object identification and object tracking in accordance with the teachings hereof.

Reference is now being made to the flow diagram of FIG. 7 which illustrates one embodiment of the present method for object identification and tracking in a video sequence. Flow processing begins at 700 and immediately proceeds to step 702.

At step 702, a video sequence is received from an imaging sensor. The imaging sensor can be, for example, a monochrome video camera, a RGB video camera, a multi-spectral video camera, or a hyper-spectral video camera. One example imaging system for capturing and transmitting a video sequence is shown and discussed with respect to the object identification and tracking system of FIG. 6.

At step 704, an area of interest is identified in the video sequence. The area of interest is selected because there are objects of interest in that area which are intended to be analyzed for their spectral components such that the material comprising those objects can be identified. Example areas of interest are shown in FIG. 1. Areas of interest can be selected by a user making a selection using a workstation and a mouse to draw a rubber-band box around one or more areas of interest in one or more image frames of the captured video. One example workstation having a mouse is shown and discussed with respect to FIG. 9. The area of interest may be automatically selected using a motion/background detection algorithm which detects a movement in a video sequence by continuously performing a frame-by-frame comparison of captured image data. The area of interest may be fixed as shown and discussed with respect to FIG. 4.

At step 706, the location of the area of interest in the scene is communicated to a spectral sensor.

At step 708, the spectral sensor is used to capture one or more spectral images of the area of interest. Each spectral image comprises a 2D array different spectral planes, each pixel location of each of the spectral planes has an associated spectral reflectance value obtained at a wavelength band of interest.

At step 710, pixel values in the spectral planes of the captured spectral images are analyzed to identify a material comprising an object in the area of interest. In one embodiment, material identification comprises a pixel classification method whereby materials are identified by a classification having been determined for each pixel location in the spectral planes of the captured image data by cross-referencing pixel intensity values against the spectral characteristics of known materials in a materials spectral database. The above-incorporated reference by Mestha et al. entitled: Method For Classifying A Pixel Of A Hyperspectral Image In A Remote Sensing Application, teaches object identification via pixel classification.

At step 712, the location of the identified object is communicated to an imaging sensor. The imaging sensor has a control system which enables the imaging sensor to track the object as it moves across a plurality of video image frames. The imaging sensor may continue to track the identified object until the occurrence of a terminating event such as, for instance, the object of interest is blocked from the camera's view for a pre-determined amount of time, or a human intervention. Thereafter, in this embodiment, further processing stops. It should be appreciated that the method of FIG. 7 can be iterated as needed for identification and tracking of other objects of interest. The spectral sensor could return multiple locations of multiple identified objects or none in the identified area of interest.

Flow Diagram of an Example Embodiment

Figure 8:
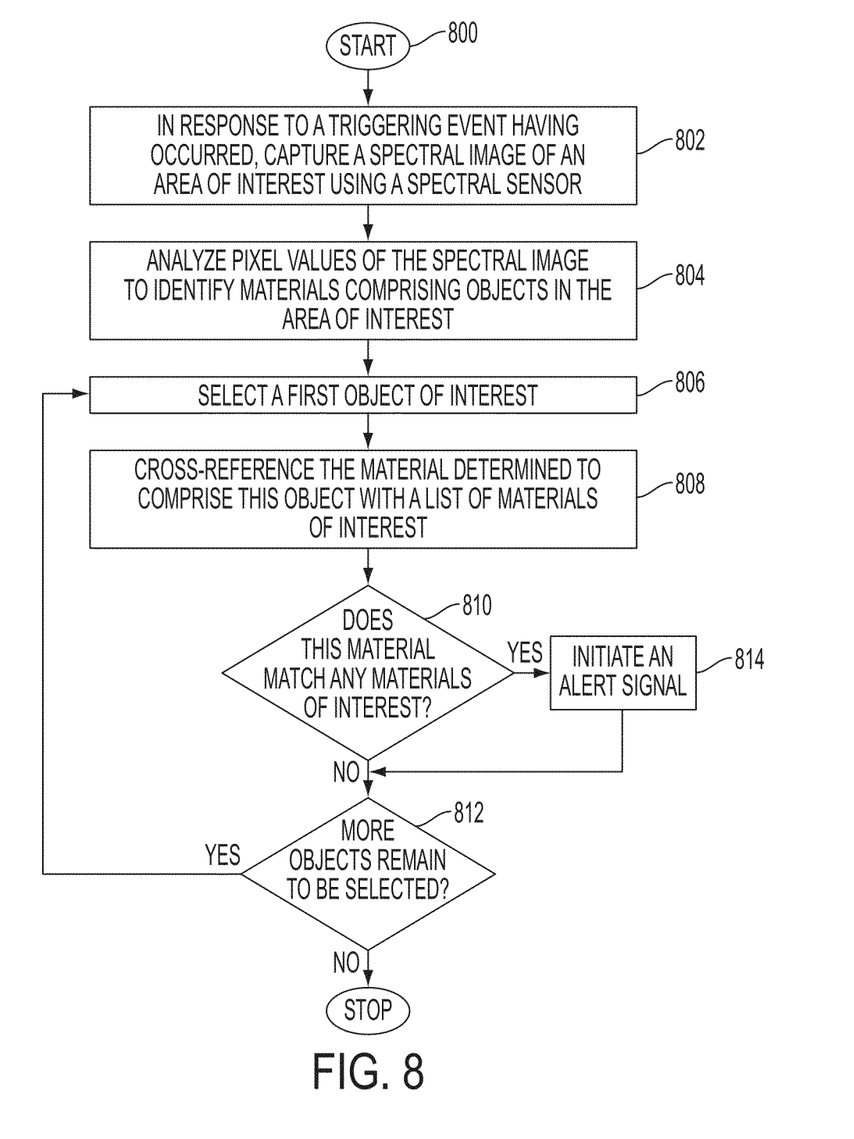
FIG. 8 is a flow diagram of another embodiment of the present method for object identification.

Reference is now being made to the flow diagram of FIG. 8 which illustrates another embodiment of the present method for object identification. Flow processing begins at 800 and immediately proceeds to step 802.

At step 802, in response to a triggering event having occurred, one or more spectral images of an area of interest are captured by a spectral sensor. Each spectral image comprises an array of different spectral planes with each pixel location of each of the spectral planes having an associated spectral reflectance value obtained at a wavelength band of interest.

At step 804, pixel values in the spectral planes of the captured spectral images are analyzed to identify a material comprising objects in the area of interest.

At step 806, a first object is identified or otherwise selected from the objects in the area of interest. The user can select the objects using, for example, a graphical user interface of a computer workstation, or the objects can be iteratively processed.

At step 808, a material comprising the selected object is cross-referenced with a list of materials of interest.

At step 810, a determination is made whether the material comprising this object matches any materials of interest on the list. If not then, at step 812, a determination is made whether anymore objects remain to be processed. If so then processing repeats with respect to step 806 wherein a next object is identified or otherwise selected for processing and a determination is made whether the materials determined to comprise the next selected object match any of the materials on the list of materials of interest. Processing repeats until all the objects identified in the area of interest have been processed accordingly. If, at step 810, a material comprising the object matches one of the materials of interest on the list then, at step 814, an alert signal is sent. The alert signal may comprise a light blinking, an alarm sounding, a message flashing on a monitor display, a message being sent, and the like. Such an alert can take a variety of forms and would depend on the environment wherein the teachings here find their intended uses. Thereafter, processing proceeds with respect to step 812 wherein a determination is made whether anymore objects remain to be processed. If so then processing repeats with respect to step 806. If no more objects of interest remain in the area of interest for selection then, in this embodiment, further processing stops.

It should be appreciated that the flow diagrams hereof are illustrative. One or more of the operative steps illustrated in any of the flow diagrams may be performed in a differing order. Other operations, for example, may be added, modified, enhanced, condensed, integrated, or consolidated with the steps thereof. Such variations are intended to fall within the scope of the appended claims. All or portions of the flow diagrams may be implemented partially or fully in hardware in conjunction with machine executable instructions.

Example Imaging Processing System

Figure 9:
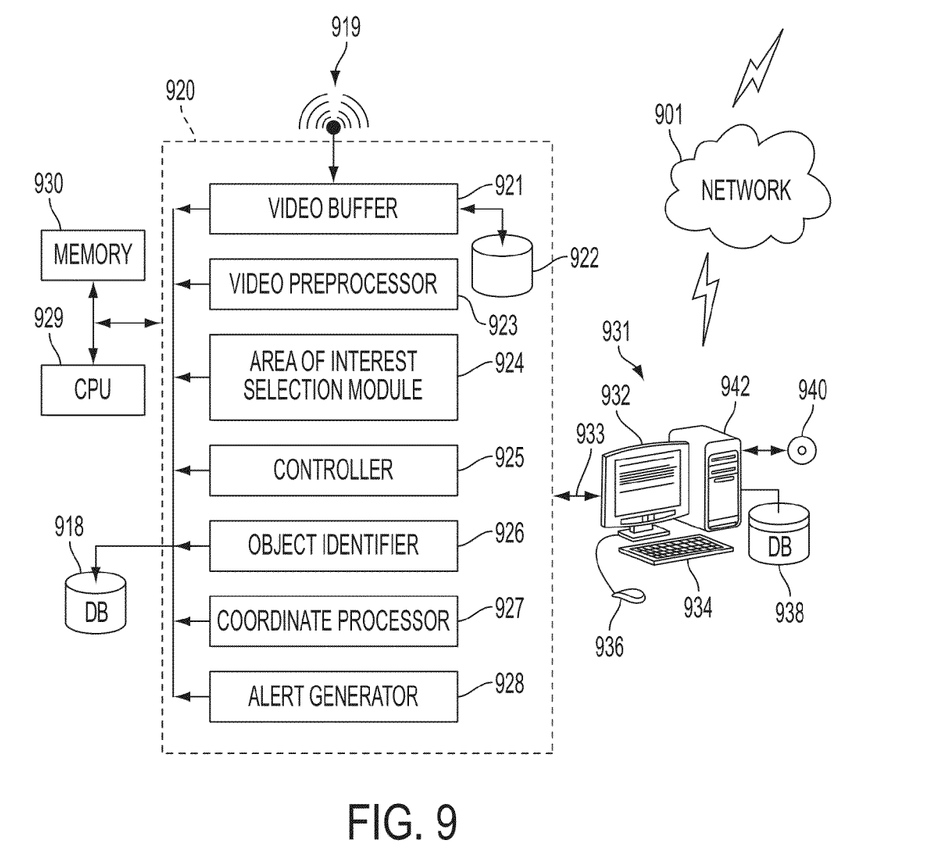
FIG. 9 shows a functional block diagram of an example image processing system in communication with a workstation and the camera systems of FIG. 6.

Reference is now being made to FIG. 9 which shows a workstation 931 comprising a display monitor 932 for displaying video images captured of scene 602 by imaging sensor 604 and/or spectral sensor 612, and a block diagram of an image processing system 920 for processing the captured images in accordance with the teachings hereof.

In this embodiment, an operator watches the received video images on workstation 931 and uses the graphical user interface thereof, e.g., keyboard 934 and mouse 936, to identify areas of interest intended to be captured by the spectral sensor 612 such that a spectral analysis can be performed to identify materials comprising an object in that area. Using the graphical user interface of workstation 931, a user thereof may change the position, angles, focus, lens, field of view, or adjust any of the functionality of either imaging sensor 604 or spectral sensor 612. Commands entered or otherwise selected by the user are sent via network 901 to any of antennas 616 or 607 to effectuate changes or otherwise adjust the features and functionality of either camera system. Such commands and software interfaces may be stored and/or retrieved from storage medium 938 and/or to computer readable media 940. Information stored to media 940 can be retrieved by a media reader such as, for example, a CD-ROM drive, located inside of computer case 942. Workstation 931 is in communication with one or more remote devices via network 901 using communication devices such as a wireless network card (not shown) which is internal to computer case 942. Workstation 931 is also in communication with image processing system 920 via communication bus 933.

Image processing system 920 is in communication with imaging sensor 604 and spectral sensor 612 via communication antenna 919. Although device 919 is shown as an antenna, it should be appreciated that a plurality of devices effectuate uni-directional or bi-directional communication between devices. Such devices are well known. The illustration of an antenna is for explanatory purposes and should not be viewed as limiting the communication pathways between any of the devices of FIGS. 6 and 9 to a device requiring an antenna. Such communication can be wired or wireless. Video buffer 921 buffers receives images such as images received from camera 604 and/or spectral images received from spectral sensor 612 for storage and processing. Video Pre-Processor 923 processes the captured video images in advance of further processing in accordance with the teachings hereof. Pre-processing images captured by camera 604 can have a variety of forms. For example, images can be contrast enhanced utilizing known contrast enhancement techniques such as histogram equalization or contrast adjustment. Images can be skew and rotation corrected as needed. Any gaps detected between frames in each of the x and y directions can be processed accordingly. Images can be boundary corrected and cropped and frame registration performed. Images captured by spectral sensor 612 can be pre-processed for relative shift due to the location of each filter band within the filter and camera-to-object distance can also be corrected, if needed. Intensity values associated with pixels of images can be re-scaled based on the sensor response of each wavelength band. Processed images are communicated to workstation 931 and displayed, for example, on a split-screen of graphical display 932 such that objects/persons moving in scene 602 can be visually monitored and objects of interest and areas of interest can be detected or selected. For example, upon an operator of workstation 931 seeing an object of interest or a person of interest such as, for example, object of interest 102 or person of interest 103 of FIG. 1, the operator can use mouse 936 to make a selection by, for instance, placing a rubber-band box around one or more areas of interest encompassing objects of interest, such as the areas of interest of FIG. 1. Area of interest selection module 924 facilitates or otherwise effectuates a user selection of one or more areas of interest and determines a location of the areas of interest for communication to spectral sensor 612. In one embodiment, the selected areas of interest are provided to Controller 925 which sends control signals to spectral sensor 612 such that the orientation thereof is changed and the focus of the lens thereof are changed so that the spectral sensor 612 can capture one or more spectral images of the selected area, such as area 601 in adjusted field of view 614B. Object Identifier Module 926 receives the spectral image data captured of area of interest 601 and performs a spectral analysis to determine materials comprising objects in each area of interest. Reflectances of pixel values are cross-referenced with the spectral components of known materials in a materials spectral database 918. Upon identification of the materials comprising the object(s) identified in the selected areas of interest, Coordinate Processor 927 determines a location of those objects using pixel locations of the materials comprising the object and communicates the coordinate locations of the objects to Controller 925 which, in turn, sends signals to controller 610 to move imaging system 604 such that a movement of the identified object(s) in the area(s) of interest can be tracked as it traverses scene 602.

In another embodiment, spectral sensor 604 is focused on a pre-defined area of interest such as all of scene 601 in field of view 614A and, upon a triggering event having occurred such as, for instance, a motion sensor having been tripped, captures spectral images of that area. The captured spectral images are processed such that materials comprising objects in that image are identified. In this embodiment, a pre-determined list of the spectral composition of known materials of interest such as different types of explosives, for example, is automatically referenced to determine whether any materials in the captured image are on that materials list. If any of the materials determined to be in the captured image are found on the list of materials of interest then Alert Generator 928 sends out an alert signal to notify authorities that a material of interest has been detected. In one embodiment, different colors are used to signal different materials detected. For instance, red may indicate that a highest level of dangerous materials has been detected and the color red may flash in a light or on a monitor screen of a law enforcement authority. A text message may be sent to a list of pre-determined persons indicating the nature of the materials detected and the location of the object. In yet another embodiment, upon detection of a material of interest, Coordinate Processor 927 automatically draws a box around the object such as box 404 and 406 of FIG. 4, and the coordinates of those boxes is communicated to imaging sensor 604 for subsequent tracking. Workstation 931 further receives the results of the spectral analysis and communicates those results or sends an alert to one or more remote devices over network 901 in response to the nature of the identified materials.

Memory 930 and CPU 929 are in communication with any of the modules and processing units of imaging system 920 and with workstation 931 including one or more remote devices using wireless device 919 or network 901. Any of the modules in the image processing system 920 can be placed in communication with materials spectral database 918 and may store/retrieve therefrom data, variables, records, parameters, functions, machine readable/executable program instructions required to perform their intended functions. Each of the modules of system 920 may be placed in communication with one or more devices over network 901. It should be understood that any of the modules and processing units of the embodiments of FIGS. 6 and 9 are in communication with workstation 931 via pathways not shown and may further be in communication with one or more remote devices over network 901. It should be appreciated that some or all of the functionality for any of the modules of system 920 may be performed, in whole or in part, by components internal to workstation 931 or by a special purpose computer system such as the system of FIG. 10.

Various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Example Special Purpose Computer

Figure 10:
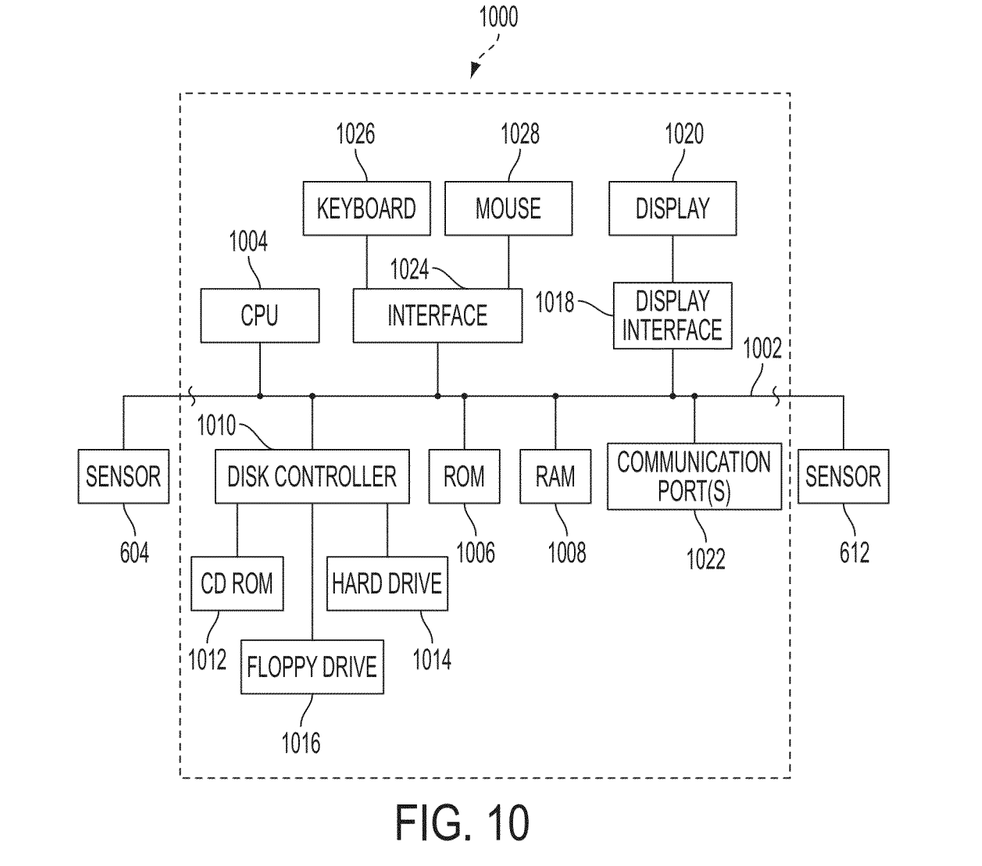
FIG. 10 shows a special purpose computer system for implementing various aspect of the present system and method as shown and described with respect to the block diagrams of FIGS. 6 and 9 and the flow diagrams of FIGS. 7 and 8.

FIG. 10 is a functional block diagram of a special purpose computer system 1000 for implementing various aspect of the present system and method as shown and described with respect to the block diagrams of FIGS. 6 and 9 and the flow diagrams of FIGS. 7 and 8. Such a special purpose processor is capable of executing machine executable program instructions and may comprise any of a micro-processor, microcontroller, ASIC, electronic circuit, or any combination thereof.

In FIG. 10, communications bus 1002 is in communication with a central processing unit (CPU) 1004 capable of executing machine readable program instructions for performing any of the calculations, comparisons, logical operations, and other program instructions for performing any of the steps described above with respect to the flow diagrams and illustrated embodiments hereof. Processor 1004 is in communication with memory (ROM) 1006 and memory (RAM) 1008 which, collectively, constitute example storage devices. Such memory may be used to store machine readable program instructions and other program data and results to sufficient to carry out any of the functionality described herein. Disk controller 1010 interfaces with one or more storage devices 1014 which may comprise external memory, zip drives, flash memory, USB drives, or other devices such as CD-ROM drive 1012 and floppy drive 1016. Storage device stores machine executable program instructions for executing the methods hereof. Such storage devices may be used to implement a database wherein various records are stored. Display interface 1018 effectuates the display of information on display 1020 in various formats such as, for instance, audio, graphic, text, and the like. Interface 1024 effectuates a communication via keyboard 1026 and mouse 1028, collectively a graphical user interface. Such a graphical user interface is useful for a user to enter information about any of the displayed information in accordance with various embodiments hereof. Communication with external devices may occur using example communication port(s) 1022. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The methods provided herein can also be implemented by physical incorporation into an image processing or color management system. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for object identification and tracking, the method comprising:
   receiving a video comprising a plurality of image frames obtained using an imaging sensor operating in a first mode with high spatial resolution and high frame rate for object tracking;
   identifying at least one an area of interest in said video sequence and switching said imaging sensor to operate in a second mode with higher spectral resolution for material analysis;
   communicating a location of said area of interest to a spectral sensor;
   capturing, by said spectral sensor, a spectral image comprising different spectral planes of said area of interest, each of said spectral planes have pixel locations corresponding to a reflectance at a wavelength band of interest;
   analyzing pixel values in said spectral image to identify a material comprising at least one object in said area of interest, said analyzing comprising determining a classification for each pixel location in said spectral image based upon a pixel's intensity value cross-referenced against spectral characteristics of known materials in a materials spectral database;
   cross-referencing said identified material of said object with a list of materials of interest; and
   in response to said identified material matching any of said list of materials of interest, performing at least one of: continuously tracking said object using said imaging sensor until the occurrence of a terminating event, and initiating an alert.

2. The method of claim 1, wherein said area of interest is identified by any of: a motion/background detection algorithm, and a user making a selection.

3. The method of claim 1, wherein said spectral sensor comprises any of: a multi-spectral sensor and a hyper-spectral sensor.

4. The method of claim 1, wherein said area of interest is identified in response to the occurrence of a triggering event.

5. The method of claim 1, wherein said imaging sensor is one of: a monochrome video camera, RGB video camera, a multi-spectral video camera, and a hyper-spectral video camera.

6. The method of claim 1, wherein said image sensor and said spectral sensor is the same sensor.

7. The method of claim 1, wherein said spectral characteristics are determined using any of: a Linear Discriminant Analysis, and a data clustering method such as K-means, and wherein said spectral characteristics comprise any of: a relevant principal component, and a relevant independent component.

8. The method of claim 1, further comprising reducing at least one of said captured spectral planes to a subspace to obtain a data reduced domain, said subspace comprising any of: a single channel gray level image, a 3-channel pseudo color image, and a n−1 channel color image where n is the number of channels in said data cube.

9. A system for object identification and tracking, comprising:
   an imaging sensor operating in a first mode for capturing high spatial resolution video images and high frame rate for object tracking; and
   a processor in communication with said imaging sensor and said controller, said processor executing machine readable instructions for performing the method of:
      receiving a video comprising a plurality of image frames obtained using an imaging sensor operating in said first mode;
      identifying at least one an area of interest in said video sequence and switching said imaging sensor to operate in a second mode with higher spectral resolution for material analysis;
      cross-referencing said identified material of said object with a list of materials of interest; and
      in response to said identified material matching any of said list of materials of interest, performing at least one of: continuously tracking said object using said imaging sensor until the occurrence of a terminating event, and initiating an alert.

10. The system of claim 9, wherein said imaging sensor is one of: a monochrome video camera, a RGB video camera, a multi-spectral video camera, and a hyper-spectral video camera.

11. The system of claim 9, wherein said image sensor and said spectral sensor are the same sensor.

12. The system of claim 9, wherein said spectral sensor comprises any of: a multi-spectral sensor and a hyper-spectral sensor.

13. The system of claim 9, wherein said spectral characteristics are determined using any of: a Linear Discriminant Analysis, and a data clustering method such as K-means, and wherein said spectral characteristics comprise any of: a relevant principal component, and a relevant independent component.

14. The system of claim 9, further comprising reducing at least one of said spectral planes to a subspace to obtain a data reduced domain, said subspace comprising any of: a single channel gray level image, a 3-channel pseudo color image, and a n−1 channel color image where n is the number of channels in said data cube.

* * * * *